United States Patent
Hahne

(10) Patent No.: US 8,983,729 B2
(45) Date of Patent: Mar. 17, 2015

(54) STABILIZATION OF A VEHICLE COMBINATION

(71) Applicant: GM Global Technology Operations LLC, Detroit, MI (US)

(72) Inventor: Uwe Hahne, Buettelborn (DE)

(73) Assignee: GM Global Technology Operations LLC, Detroit, MI (US)

( * ) Notice: Subject to any disclaimer, the term of this patent is extended or adjusted under 35 U.S.C. 154(b) by 8 days.

(21) Appl. No.: 13/742,954

(22) Filed: Jan. 16, 2013

(65) Prior Publication Data

US 2013/0190989 A1 Jul. 25, 2013

(30) Foreign Application Priority Data

Jan. 17, 2012 (DE) .................. 10 2012 000 784

(51) Int. Cl.
- *B60W 10/20* (2006.01)
- *B60W 10/22* (2006.01)
- *B60T 8/17* (2006.01)
- *B60T 8/1755* (2006.01)

(52) U.S. Cl.
CPC .......... *B60W 10/20* (2013.01); *B60Y 2200/147* (2013.01); *B60T 8/1708* (2013.01); *B60W 2540/18* (2013.01); *B60T 8/1755* (2013.01); *B60W 10/22* (2013.01)
USPC ........................................................ 701/42

(58) Field of Classification Search
CPC ..... B60T 8/1708; B60T 8/1755; B60T 8/248; B60T 8/246; B60T 2230/06; B60W 10/20; B60W 10/22; B60W 2050/0071; B60W 2050/0073; B60W 2540/18; B60W 30/09; B60W 40/109; B60W 2520/10; B60W 2720/106; B60Y 2200/147

USPC ........ 701/42, 50, 70; 303/123, 146, 121, 124, 303/138; 280/400, 423.1, 656; 180/14.6, 180/14.2, 11; 340/431
See application file for complete search history.

(56) References Cited

U.S. PATENT DOCUMENTS

| | | | |
|---|---|---|---|
| 5,108,158 | A | 4/1992 | Breen |
| 6,516,260 | B2 | 2/2003 | Wetzel et al. |

(Continued)

FOREIGN PATENT DOCUMENTS

| | | | |
|---|---|---|---|
| DE | 19536620 | A1 | 4/1997 |
| DE | 19964048 | A1 | 1/2001 |

(Continued)

OTHER PUBLICATIONS

German Patent Office, German Search Report for Application No. 10 2012 000 784.1 dated May 29, 2012.
Search Report conducted on Feb. 27, 2013 for GB1219385.0 (mailed Feb. 28, 2013).

*Primary Examiner* — Marthe Marc-Coleman
(74) *Attorney, Agent, or Firm* — Ingrassia Fisher & Lorenz, P.C.

(57) ABSTRACT

A method and device for stabilizing a vehicle combination consisting of a tractor vehicle and a trailer are provided. In an embodiment, the method includes detecting a steering intervention that acts upon the steered wheels of the tractor vehicle and determining a current steering angle change $\Delta\delta(t)$ caused by the steering intervention and a corresponding current angular steering velocity $d\delta(t)/dt$. A current speed of the tractor vehicle $v(t)$ is determined A braking intervention, by which the wheel brakes of the trailer are activated, is automatically triggered in dependence on the current steering angle change $\Delta\delta(t)$, the current angular steering velocity $d\delta(t)/dt$, and the current speed $v(t)$.

14 Claims, 2 Drawing Sheets

(56) References Cited

U.S. PATENT DOCUMENTS

| | | | |
|---|---|---|---|
| 2001/0032043 A1* | 10/2001 | Wetzel et al. | 701/50 |
| 2004/0124697 A1* | 7/2004 | MacGregor et al. | 303/89 |
| 2005/0060082 A1 | 3/2005 | Heuer et al. | |
| 2005/0108158 A1 | 5/2005 | Prisant | |
| 2013/0158801 A1* | 6/2013 | Tober et al. | 701/41 |

FOREIGN PATENT DOCUMENTS

| | | | |
|---|---|---|---|
| DE | 19964058 A1 | 7/2001 | |
| DE | 102004010296 A1 | 12/2004 | |
| DE | 102004010296 A1 * | 12/2004 | B60T 8/17 |
| DE | 102004005074 A1 | 4/2005 | |
| DE | 102007008486 A1 | 12/2007 | |
| DE | 102007008486 A1 * | 12/2007 | B60T 8/1755 |

* cited by examiner

STABILIZATION OF A VEHICLE COMBINATION

CROSS-REFERENCE TO RELATED APPLICATION

This application claims priority to German Patent Application No. 102012000784.1, filed Jan. 17, 2012, which is incorporated herein by reference in its entirety.

TECHNICAL FIELD

The technical field pertains to a method and a device for stabilizing a vehicle combination consisting of a tractor vehicle and a trailer.

BACKGROUND

Methods and devices for stabilizing a vehicle combination are known from the prior art. For example, DE 199 64 048 A1 discloses a method and a device for stabilizing a road vehicle, particularly a passenger car, with a trailer that is pulled by the road vehicle. The road vehicle is monitored with respect to rolling motions and, when a rolling motion is detected, a yawing moment that essentially is in phase opposition to the rolling motion is automatically impressed on the road vehicle.

DE 10 2004 010 296 Al discloses a method for stabilizing a vehicle combination consisting of a tractor vehicle and a trailer or semitrailer. Symmetric braking interventions are initially carried out on the tractor vehicle when a rolling motion of the trailer or semitrailer is detected in order to dampen this rolling motion. Asymmetric braking interventions are subsequently carried out on the tractor vehicle if the desired attenuation of the rolling motion is not achieved by the symmetric braking interventions.

DE 10 2004 005 074 A1 discloses a device for damping the rolling motions of a trailer that is pulled by a road vehicle. The device comprises rolling motion detecting means for determining a rolling motion of the trailer, as well as the intensity of the rolling motion based on a variable, in which at least one variable that describes the lateral vehicle dynamics comes into play, and rolling motion damping means for damping the rolling motion based on automated braking interventions on the road vehicle and/or based on a driver-independent reduction of the engine torque if the intensity of the rolling motion exceeds an intensity limit value. The device furthermore comprises steering angle analyzing means for determining at least one parameter from a time history of the steering angle, wherein the aforementioned intensity limit value is dependent on the parameter.

The methods and devices for stabilizing a vehicle combination known from the prior art essentially concern the detection and damping of already existing rolling motions of the trailer and/or the tractor vehicle as they are induced, in particular, by braking and/or evasive maneuvers of the tractor vehicle.

It is at least one objective herein to provide a method and a device that allow an improved stabilization of a vehicle combination during braking and/or evasive maneuvers. In addition, other objects, desirable features and characteristics will become apparent from the subsequent summary and detailed description, and the appended claims, taken in conjunction with the accompanying drawings and this background.

SUMMARY

A method for stabilizing a vehicle combination consisting of a tractor vehicle and a trailer is provided herein. In an exemplary embodiment, the inventive method is characterized in that a steering intervention acting upon the steered wheels of the tractor vehicle is detected. A current steering angle change $\Delta\delta(t)$ caused by the steering intervention, a corresponding current angular steering velocity $d\delta(t)/dt$, and a current speed $v(t)$ of the tractor vehicle are determined A braking intervention, by which the wheel brakes of the trailer are activated, is automatically triggered in dependence on the current steering angle change $\Delta\delta(t)$, the current angular steering velocity $d\delta(t)/dt$, and the current speed $v(t)$.

An inventive automatic braking intervention makes it possible to preserve a dynamic longitudinal stability of the vehicle combination driving with the speed $v(t)$ to prevent or at least reduce an oscillation build-up of the vehicle combination and to prevent or reduce the risk of the trailer colliding with the tractor vehicle.

In contrast to the prior art, the inventive braking intervention is not triggered in dependence of already occurring oscillations of the vehicle combination, but rather in dependence on the current steering angle change $\Delta\delta(t)$, the current angular steering velocity $d\delta(t)/dt$, and the current speed $v(t)$ of the tractor vehicle, i.e., when a potentially oscillation-inducing steering intervention is initiated, and consequently prior to the occurrence of such oscillations. In further contrast to the prior art, the braking intervention is carried out on the trailer.

In the present context, the term "trailer" includes trailers that are connected to a trailer coupling of the tractor vehicle by means of a hitch (e.g., travel trailers, boat trailers, etc.) or so-called semitrailers that transfer part of their weight to the axles of the tractor vehicle, to which they are connected by means of a fifth-wheel plate and a so-called "king pin." The trailer presently features at least one axle that preferably has individually brakable wheels. With respect to trailers that feature several axles, the following explanations apply accordingly to each axle with brakable wheels.

In the present context, the term "steering intervention" includes manual steering interventions that are initiated by the driver of the tractor vehicle, as well as automatic steering interventions as can be initiated, for example, by an automatically operating lateral steering system of the tractor vehicle. Such steering interventions cause a change $\Delta\delta(t)$ of a current steering angle $\delta(t)$ of the steered wheels of the tractor vehicle (typically the front wheels). The angular steering velocity $d\delta(t)/dt$ provides information on how "fast" the steering angle $\delta(t)$ changes due to the steering intervention.

During its normal operation, the vehicle combination typically drives without the occurrence of rolling motions of the trailer or the tractor vehicle such that the tractor vehicle and the trailer form a dynamically stable system. However, a low yawing moment acting upon the tractor vehicle and consequently a low yaw rate are generated if steering interventions are initiated in a tractor vehicle driving with the speed $v(t)$ with a slow intervention speed, i.e., with a slow angular steering velocity $d\delta(t)/dt$, and with a small steering angle change $\Delta\delta(t)$. During the normal operation of the vehicle combination, this driving situation typically occurs at the beginning of curves or when changing lanes. The longitudinal stability of the vehicle combination is not reduced or only negligibly reduced by such steering interventions.

However, a correspondingly high yawing moment acting upon the tractor vehicle and consequently a high yaw rate are generated if steering interventions are initiated in the tractor vehicle driving with the speed $v(t)$ with a high intervention speed, i.e., with a high current angular steering velocity $d\delta(t)/dt$, and with a large current steering angle change $\Delta\delta(t)$. This induces oscillations or rolling motions of the tractor vehicle and the trailer and significantly reduces the stability of the vehicle combination such that an oscillation build-up of the vehicle combination may occur and, in the worst-case scenario, result in accidents.

The influence of a steering intervention on the longitudinal stability of the vehicle combination is dependent on the speed $v(t)$ of the tractor vehicle. If the vehicle combination is at a standstill or drives with walking speed, the risk of an oscillation build-up is "zero" or negligible such that no automatic braking intervention is triggered on the wheel brakes of the trailer in this case irrespective of a steering intervention.

According to an exemplary embodiment, a function $F1(\Delta\delta(t), d\delta(t)/dt, v)$ is defined that assigns each realizable driving state of the tractor vehicle defined by a combination of the driving state variables steering angle change $\Delta\delta$, angular steering velocity $d\delta/dt$ and speed $v$ of the tractor vehicle a function value $F1$ that indicates a danger level of the driving state. In this respect, the function $F1$ preferably is specifically designed for the tractor vehicle or the vehicle combination. In this embodiment, the automated braking intervention on the wheel brakes of the trailer is triggered if the current function value $F1=F1(\Delta\delta(t), d\delta(t)/dt, v(t))$ for a current driving state at the time t (current steering angle change $\Delta\delta(t)$, current angular steering velocity $d\delta(t)/dt$ and current speed $v(t)$) is greater than or equal to a predetermined first limit value $G1$.

In an embodiment, an automatic braking intervention is only triggered in dependence on the current steering angle change $\Delta\delta(t)$, the current angular steering velocity $d\delta(t)/dt$ and the current speed $v(t)$ if these variables would result in a prospective critical driving state of the vehicle combination as indicated, e.g., by a correspondingly high assigned function value $F1$, wherein $F1 \geq G1$. The braking intervention triggered in this case increases the longitudinal stability of the vehicle combination such that this critical driving state optimally does not even occur. In this respect, the function $F1$ implicitly expresses an anticipatory evaluation of a driving maneuver (steering intervention) initiated by a current steering intervention.

According to an alternative embodiment, "look-up" tables are provided that contain values indicating the danger level of the respective driving state for a plurality of realizable driving states of the tractor vehicle (defined by the steering angle change $\Delta\delta$, the angular steering velocity $d\delta/dt$ and the speed $v$). In this enhancement, the braking intervention is triggered in the above-described fashion if the value for a current driving state is greater than or equal to a predetermined first limit value $G1$.

In this case, the automatically triggered braking intervention typically takes place before oscillations of the trailer occur and causes a longitudinal stabilization of the vehicle combination that also prevents or reduces the risk of the trailer colliding with the tractor vehicle during an (emergency) braking maneuver and dampens the occurrence of rolling motions during an (emergency) evasive maneuver.

In another embodiment, a function $F2(\Delta\delta(t), d\delta(t)/dt, v, aq, al, gr)$ is defined assigning each realizable driving state of the tractor vehicle defined by a combination of the driving state variables steering angle change $\Delta\delta$, angular steering velocity $d\delta/dt$, speed $v$, lateral acceleration $aq$, yaw rate $gr$ and longitudinal deceleration $al$ a function value $F2$ that indicates a danger level of the driving state. In this variation, the braking intervention is triggered if the current function value $F2=F2(\Delta\delta(t), d\delta(t)/dt, v(t), aq(t), al(t), gr(t))$ for the current driving state is greater than or equal to a predetermined second limit value $G2$.

In this variation, it is possible, for example, to take into account other driving situations in which no or only a slight steering intervention is initiated in the tractor vehicle that by itself would have no critical effect at all on the longitudinal stability of the vehicle combination and therefore would not result in the triggering of an automatic braking intervention on the trailer, but in which external influences impress a motion on the tractor vehicle that leads, e.g., to a high lateral acceleration and/or a high yaw rate and/or a high longitudinal deceleration.

Alternative embodiments of this embodiment result from analogously applying the preceding explanations to the following functions:

a. $3F(\Delta\delta, d\delta/dt, v, aq)$,
b. $4F(\Delta\delta, d\delta/dt, v, al)$,
c. $5F(\Delta\delta, d\delta/dt, v, gr)$,
d. $6F(\Delta\delta, d\delta/dt, v, aq, al)$,
e. $7F(\Delta\delta, d\delta/dt, v, aq, gr)$, and
f. $8F(\Delta\delta, d\delta/dt, v, al, gr)$.

In an embodiment, the wheel brakes of the trailer are activated symmetrically due to the braking intervention. In the present context, a symmetrical braking intervention refers to both wheels of an axle of the trailer being identically decelerated, for example, to the brake linings being pressed against the brake discs with the same intensity. The wheel brakes of the trailer preferably feature an antilock braking system (ABS system) such that a maximal braking moment transfer can be realized on the one hand and blocking of the wheels is prevented on the other hand. The wheels of the trailer, in an embodiment, are also individually controllable/brakable.

In a further embodiment, the intensity of the braking intervention is selected in dependence on the current steering angle change $\Delta\delta(t)$ and the current angular steering velocity $d\delta(t)/dt$ and/or a current lateral acceleration $aq(t)$ of the tractor vehicle and/or a current longitudinal deceleration $al(t)$ of the tractor vehicle and/or a current yaw rate $gr(t)$ of the tractor vehicle. In another embodiment of the inventive method, the braking intervention either takes place symmetrically or asymmetrically in dependence on one or more of the aforementioned variables.

It would be conceivable that situations arise, in which the determination of a reliable current steering angle change $\Delta\delta(t)$, angular steering velocity $d\delta(t)/dt$, and speed $v(t)$ or of a current lateral acceleration $aq(t)$, yaw rate $gr(t)$ and longitudinal deceleration $al(t)$ is not possible, e.g., due to the failure of sensors required for this purpose or due to the required information not being available with sufficient quality and reliability such that the inventive method cannot be carried out.

In such a situation, in an embodiment, the driver of the tractor vehicle is informed accordingly by outputting an optical and/or acoustical warning and the inventive method is stopped. If the automated braking intervention has already been triggered in such a situation, the following options may be used for terminating the method in an automated fashion. On the one hand, the braking intervention on the trailer can be immediately deactivated. On the other hand, the braking intervention may be continued in an unchanged fashion until predetermined conditions are reached and subsequently deactivated (e.g., once a predetermined time period expires) or the intensity of the current braking intervention may be reduced to "zero," i.e., no brake force, over a certain period of time in accordance with a predetermined function.

An optical and/or acoustical warning is preferably output for the driver of the tractor vehicle if a braking intervention is automatically triggered. In this respect, the driver is able to attribute the noticeable automated braking intervention to a cause. The warning being output also purposefully focuses the attention of the driver on the current driving situation and, if applicable, imminent braking maneuvers and/or evasive maneuvers.

In an embodiment, a braking intervention that was triggered in an automated fashion is terminated with a manual input of the driver on an input means, e.g., by manually actuating a lever or a button on the steering wheel and, in particular, by completely depressing the accelerator/gas pedal of the tractor vehicle. This enables the driver, e.g., to individually determine the time, at which the braking intervention is terminated, or to individually deactivate the braking intervention after an apparently spurious triggering thereof An automatically initiated braking intervention may be alternatively or additionally continued in an unchanged fashion until predetermined conditions are reached and then automatically deactivated. Such conditions may consist of a predetermined time period after the beginning of the braking intervention having expired, the vehicle combination being in a non-critical driving state and/or no occurring yawing oscillations of the tractor vehicle and of the trailer. As already mentioned above, the intensity of the current braking intervention also can be automatically reduced to "zero" over a certain period of time in accordance with a predetermined function.

Tractor vehicles and even some trailers are nowadays equipped with safety systems, assistance systems and/or comfort systems for their longitudinal and lateral control. In order to avoid conflicts with control interventions of other safety systems, assistance systems and/or comfort systems of the vehicle combination, an inventive triggering of the braking intervention and the subsequently occurring braking intervention itself are preferably coordinated with the safety systems, assistance systems and/or comfort systems of the tractor vehicle and, if applicable, the trailer.

In another exemplary embodiment, a device for stabilizing a vehicle combination consisting of a tractor vehicle and a trailer is provided. The device includes a first means that makes it possible to detect a steering intervention acting upon the steered wheels of the tractor vehicle as well as to determine a current steering angle change $\Delta\delta(t)$ caused by the steering intervention and a corresponding current angular steering velocity $d\delta(t)/dt$, a second means that make it possible to determine the current speed $v(t)$ of the tractor vehicle, and a third means that makes it possible to activate wheel brakes of the trailer in dependence on the current steering angle change $\Delta\delta(t)$, the current angular steering velocity $d\delta(t)/dt$, and the current speed $v(t)$.

In another embodiment, the device is characterized in that a fourth means is provided, by which a current lateral acceleration $aq(t)$ of the tractor vehicle can be determined and/or a fifth means is provided, by which a current longitudinal deceleration $al(t)$ of the tractor vehicle can be determined and/or a sixth means is provided, by which a current yaw rate $gr(t)$ of the tractor vehicle can be determined, and in that the third means is realized and configured in such a way that the wheel brakes of the trailer can also be activated in dependence on the current lateral acceleration $aq(t)$ and/or the current longitudinal deceleration $al(t)$ and/or the current yaw rate $gr(t)$ of the tractor vehicle.

Advantageous enhancements, corresponding advantages and elucidations of the device result from analogously transferring and applying the preceding explanations with respect to the inventive method to the above-described device.

In a further embodiment, a vehicle with an inventive device of the above-described type is provided.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the various embodiments or the application and uses thereof Furthermore, there is no intention to be bound by any theory presented in the preceding background or the following detailed description.

Figure 1:
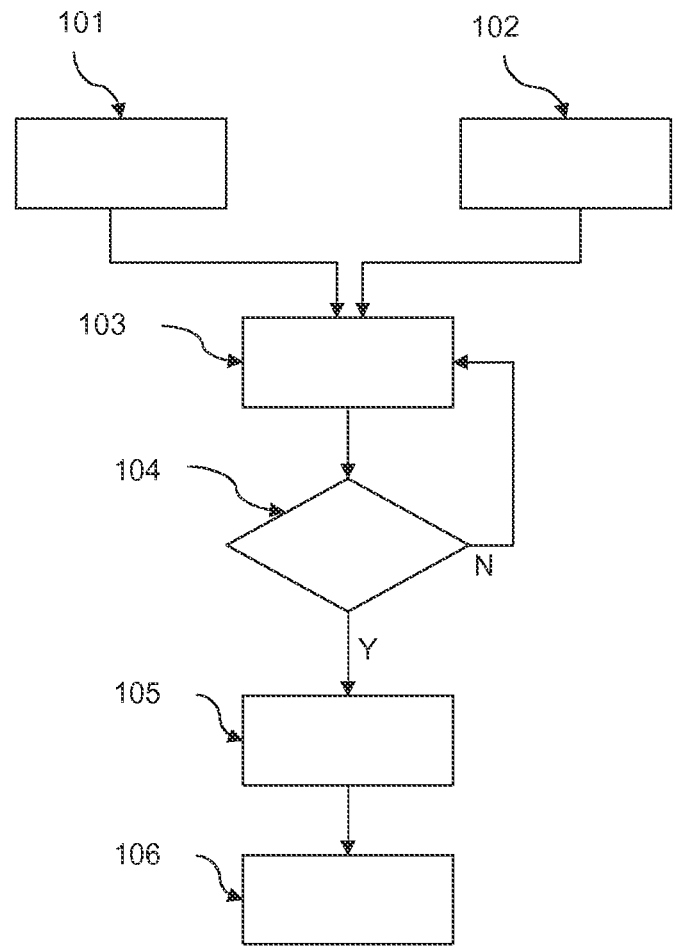
FIG. 1 shows a flow chart of method for stabilizing a vehicle combination in accordance with an exemplary embodiment.
Figure 2:
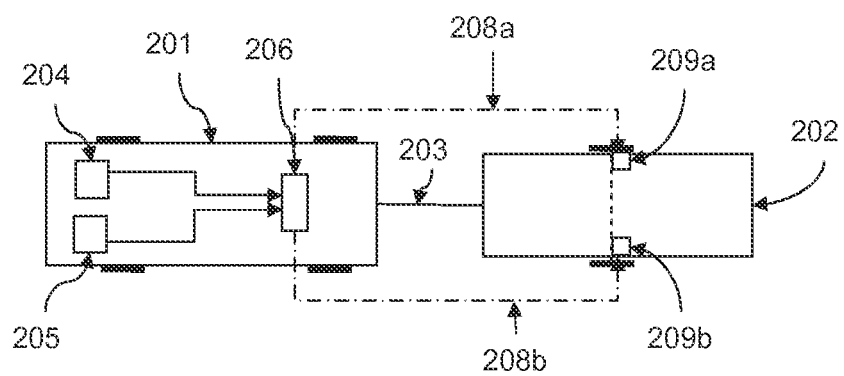
FIG. 2 shows a schematic representation of a vehicle combination with a device for stabilizing the vehicle combination in accordance with an exemplary embodiment.

FIG. 1 is a flow chart of an inventive method for stabilizing a vehicle combination during a braking maneuver and/or an invasive maneuver in accordance with an exemplary embodiment. The vehicle combination comprises a tractor vehicle 201 and a trailer 202 connected thereto, as illustrated in FIG. 2. The method comprises the following steps. In a first step 101, a steering intervention that acts upon the steered wheels of the tractor vehicle 201 is detected and a current steering angle change $\Delta\delta(t)$ caused by the steering intervention and a corresponding current angular steering velocity $d\delta(t)/dt$ are determined In a step 102, a current speed $v(t)$ of the tractor vehicle 201 is determined Both steps are continuously carried out in parallel such that the variables $\Delta\delta(t)$, $d\delta(t)/dt$ and $v(t)$ are respectively available in updated form.

In step 103, a function value $F1(t)$ that indicates a danger level of the current driving state is presently determined based on the current steering angle change $\Delta\delta(t)$, the current angular steering velocity $d\delta(t)/dt$, and the current speed $v(t)$ by a predetermined function $F1(\Delta\delta, d\delta/dt, v)$ for each realizable driving state of the tractor vehicle that is defined by a combination of the driving state variables steering angle change $\Delta\delta$, angular steering velocity $d\delta/dt$, and speed $v$ of the tractor vehicle 201.

In step 104, it is determined if the current function value $F1(t)=F1(\Delta\delta(t), d\delta(t)/dt, v(t))$ for the current driving state is greater than or equal to a predetermined first limit value G1. If this is the case (Y), a braking intervention is automatically triggered in step 105 such that the wheel brakes 209a, 209b of the trailer 202 are activated. No braking intervention takes place if this is not the case (N).

In step 106, the braking intervention is automatically terminated once a predetermined time period after its triggering has expired by exponentially reducing the braking force generated on the trailer to "zero."

FIG. 2 shows a schematic representation of a vehicle combination with a tractor vehicle 201 and a trailer 202 that is connected thereto by means of a trailer hitch 203. The vehicle combination features an inventive device for stabilizing the vehicle combination during braking maneuvers and/or evasive maneuvers. The device comprises a first means 204 that makes it possible to detect a steering intervention acting upon the steered wheels of the tractor vehicle 201 and to determine a current steering angle change $\Delta\delta(t)$ caused by the steering intervention and a corresponding current angular steering velocity $d\delta(t)/dt$, a second means 205 that makes it possible to determine a current speed v(t) of the tractor vehicle 201 and a third means 206 that makes it possible to activate wheel brakes 209a, 209b of the trailer 202 in dependence on the current steering angle change $\Delta\delta(t)$, the current angular steering velocity $d\delta(t)/dt$ and the current speed v(t).

The broken lines 208a and 208b in FIG. 2 schematically indicate the respective functional connections between the third means 206 and the respective wheel brakes 209a, 209b of the single-axle trailer 202.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A method for stabilizing a vehicle combination consisting of a tractor vehicle and a trailer, the method comprising the steps of:
    detecting, by a processor, a steering intervention that acts upon steered wheels of the tractor vehicle;
    determining, by a processor, a current steering angle change $\Delta\delta(t)$ and a current angular steering velocity $d\delta(t)/dt$ based on the detection of the steering intervention;
    determining, by a processor, a current speed of the tractor vehicle v(t); and
    determining, by a processor, a danger level of a driving state based on the current steering angle change $\Delta\delta(t)$, the current angular steering velocity $d\delta(t)/dt$, and the current speed v(t); and
    automatically triggering, by a processor, a braking intervention, by which wheel brakes of the trailer are activated, in dependence on the danger level.

2. The method according to claim 1, further comprising:
    defining a function F1($\Delta\delta(t)$, $d\delta(t)/dt$, v(t)) that assigns realizable driving states of the tractor vehicle defined by a combination of steering angle change $\Delta\delta(t)$, angular steering velocity $d\delta(t)/dt$ and speed v(t) of the tractor vehicle a function value F1 that indicates the danger level of a driving state; and
    triggering the braking intervention if a current function value F1(t)=F1($\Delta\delta(t)$, $d\delta(t)/dt$, v(t)) for a current driving state is greater than or equal to a predetermined first limit value G1.

3. The method according to claim 1, wherein at least one of a current lateral acceleration aq(t) of the tractor vehicle and/or a current yaw rate gr(t) of the tractor vehicle and a current longitudinal deceleration al(t) of the tractor vehicle is also determined and the braking intervention is also triggered in dependence on at least one of the current lateral acceleration aq(t), the current yaw rate gr(t), and the current longitudinal deceleration al(t) of the tractor vehicle.

4. The method according to claim 3, further comprising:
    defining a function F2($\Delta\delta(t)$, $d\delta(t)/dt$, v(t), aq(t), al(t), gr(t)) that assigns realizable driving states of the tractor vehicle defined by a combination of steering angle change $\Delta\delta(t)$, angular steering velocity $d\delta(t)/dt$, speed v(t), lateral acceleration aq(t), yaw rate gr(t) and longitudinal deceleration al(t) of the tractor vehicle a function value F2 that indicates the danger level of a driving state; and
    triggering the braking intervention if a current function value F2(t)=F2($\Delta\delta(t)$, $d\delta(t)/dt$, v(t), aq(t), al(t), gr(t)) for a current driving state is greater than or equal to a predetermined second limit value G2.

5. The method according to claim 1, further comprising outputting at least one of an optical and an acoustical warning for a driver when the braking intervention is triggered.

6. The method according to claim 1, further comprising selecting an intensity of the braking intervention in dependence on:
    at least one of
    the current steering angle change $\Delta\delta(t)$ and the current angular steering velocity $d\delta(t)/dt$; and at least one of
    a current lateral acceleration aq(t) of the tractor vehicle;
    a current longitudinal deceleration al(t) of the tractor vehicle; and
    a current yaw rate gr(t) of the tractor vehicle.

7. The method according to claim 1, wherein the braking intervention occurs symmetrically at least at the beginning of the braking intervention.

8. The method according to claim 1, wherein the braking intervention is coordinated with at least one of other safety systems, assistance systems and comfort systems of at least one of the tractor vehicle and the trailer.

9. The method according to claim 1, further comprising terminating an automatically triggered braking intervention with a manual input of a driver on an input means of the tractor vehicle.

10. The method according to claim 1, further comprising automatically terminating an automatically triggered braking intervention if one or more of the following conditions are fulfilled:
    a predetermined time period after the braking intervention expires,
    the vehicle combination is in a non-critical driving state;
    no yawing oscillations of the tractor vehicle or the trailer occur.

11. A device for stabilizing a vehicle combination consisting of a tractor vehicle and a trailer, the device comprising:
    a processing device configured to detect a steering intervention acting upon steered wheels of the tractor vehicle and to determine a current steering angle change $\Delta\delta(t)$ and a current angular steering velocity $d\delta(t)/dt$ based on the detection of the steering intervention;
    a processing device configured to determine a current speed v(t) of the tractor vehicle;
    a processing device configured to determine a danger level of a driving state based on the current steering angle change $\Delta\delta(t)$, the current angular steering velocity $d\delta(t)/dt$, and the the current speed v(t); and
    a processing device configured to activate wheel brakes of the trailer in dependence on the danger level.

12. The device according to claim 11, further comprising at least one of:
    a processing device configured to determine a current lateral acceleration aq(t) of the tractor vehicle;
    a processing device configured to determine a current longitudinal deceleration al(t) of the tractor vehicle;
    a processing device configured to determine a current yaw rate gr(t) of the tractor vehicle, wherein the third means is configured in such a way that the wheel brakes of the trailer are also activated in dependence on the current lateral acceleration aq(t) and/or the current longitudinal deceleration al(t) and/or the current yaw rate gr(t) of the tractor vehicle.

13. A vehicle with a device for stabilizing a vehicle combination consisting of the vehicle and a trailer, the device comprising:
- a processing device configured to detect a steering intervention acting upon steered wheels of the vehicle and to determine a current steering angle change $\Delta\delta(t)$ and a current angular steering velocity $d\delta(t)/dt$ based on the detection of the steering intervention;
- a processing device configured to determine a current speed v(t) of the vehicle;
- a processing device configured to determine a danger level of a driving state based on the current steering angle change $\Delta\delta(t)$, the current angular steering velocity $d\delta(t)/dt$, and the current speed v(t); and
- a processing device configured to activate wheel brakes of the trailer in dependence on the danger level.

14. The device according to claim 13, further comprising at least one of:
- a processing device configured to determine a current lateral acceleration aq(t) of the vehicle;
- a processing device configured to determine a current longitudinal deceleration al(t) of the vehicle; and
- a processing device configured to determine a current yaw rate gr(t) of the vehicle, wherein the third means configured in such a way that the wheel brakes of the trailer are also activated in dependence on at least one of the current lateral acceleration aq(t), the current longitudinal deceleration al(t), and the current yaw rate gr(t) of the vehicle.

* * * * *